United States Patent [19]
Löser

[11] Patent Number: 5,881,767
[45] Date of Patent: Mar. 16, 1999

[54] MODULAR PIEZO VALVE ARRANGEMENT

[75] Inventor: Ralf-Ernst Löser, Lübeck, Germany

[73] Assignee: Drägerwerk AG, Lübeck, Germany

[21] Appl. No.: 964,834

[22] Filed: Nov. 5, 1997

[30] Foreign Application Priority Data

Jun. 4, 1997 [DE] Germany ............................ 197 23 388

[51] Int. Cl.⁶ .................................................. F16L 55/02
[52] U.S. Cl. ...................... 137/599; 137/601; 251/129.06
[58] Field of Search .................................. 137/599, 601, 137/884; 251/129.06, 122

[56] References Cited

U.S. PATENT DOCUMENTS

| | | | |
|---|---|---|---|
| 3,062,410 | 11/1962 | Schwieger | 137/599 |
| 3,111,139 | 11/1963 | Beckett et al. | 251/367 |
| 3,194,257 | 7/1965 | Stephens | 251/367 |
| 3,295,552 | 1/1967 | Powell et al. | 137/604 |
| 3,382,534 | 5/1968 | Veazy | 137/604 |
| 3,614,486 | 10/1971 | Smiley | 251/129 |
| 3,746,041 | 7/1973 | Friedland | 137/301 |
| 3,889,711 | 6/1975 | Hirao | 137/599 |
| 3,952,773 | 4/1976 | Hahn | 137/604 |
| 4,020,862 | 5/1977 | Bohnlein et al. | 137/601 |
| 4,109,680 | 8/1978 | Lavender | 137/599 |
| 4,303,097 | 12/1981 | Zerby | 137/599 |
| 4,340,083 | 7/1982 | Cummins | 137/499 |
| 4,518,011 | 5/1985 | Stoll | 137/599 |
| 4,527,589 | 7/1985 | Stoll | 137/884 |
| 4,558,845 | 12/1985 | Hunkapiller | 137/884 |
| 4,709,858 | 12/1987 | Stern et al. | 137/601 |
| 4,719,941 | 1/1988 | Moser | 137/599 |
| 4,842,017 | 6/1989 | Reynolds | 137/601 |
| 4,858,636 | 8/1989 | Adkins | 137/599 |
| 4,949,757 | 8/1990 | Lashta | 137/884 |
| 5,653,259 | 8/1997 | Ramstad | 137/884 |

FOREIGN PATENT DOCUMENTS

| | | |
|---|---|---|
| 0 109 239 A1 | 5/1984 | European Pat. Off. . |
| 2094940 | 9/1982 | United Kingdom . |

*Primary Examiner*—Denise L. Ferensic
*Assistant Examiner*—Joanne Y. Kim
*Attorney, Agent, or Firm*—McGlew and Tuttle

[57] ABSTRACT

A piezo valve arrangement for gas mixers or respirators, which is built up modularly from individual valve elements. At least one individual valve element, which is provided in its housing with a pressurized gas channel and a gas discharge channel, is arranged between a connection plate with a pressurized gas connection and a gas discharge connection, on the one hand, and a closing plate, on the other hand, wherein the direction of the gas flow in each valve element is from the pressurized gas channel via a metering screw, a metering channel, and a piezo vibrating element held freely vibrating on one side with a seal to the gas discharge channel.

20 Claims, 2 Drawing Sheets

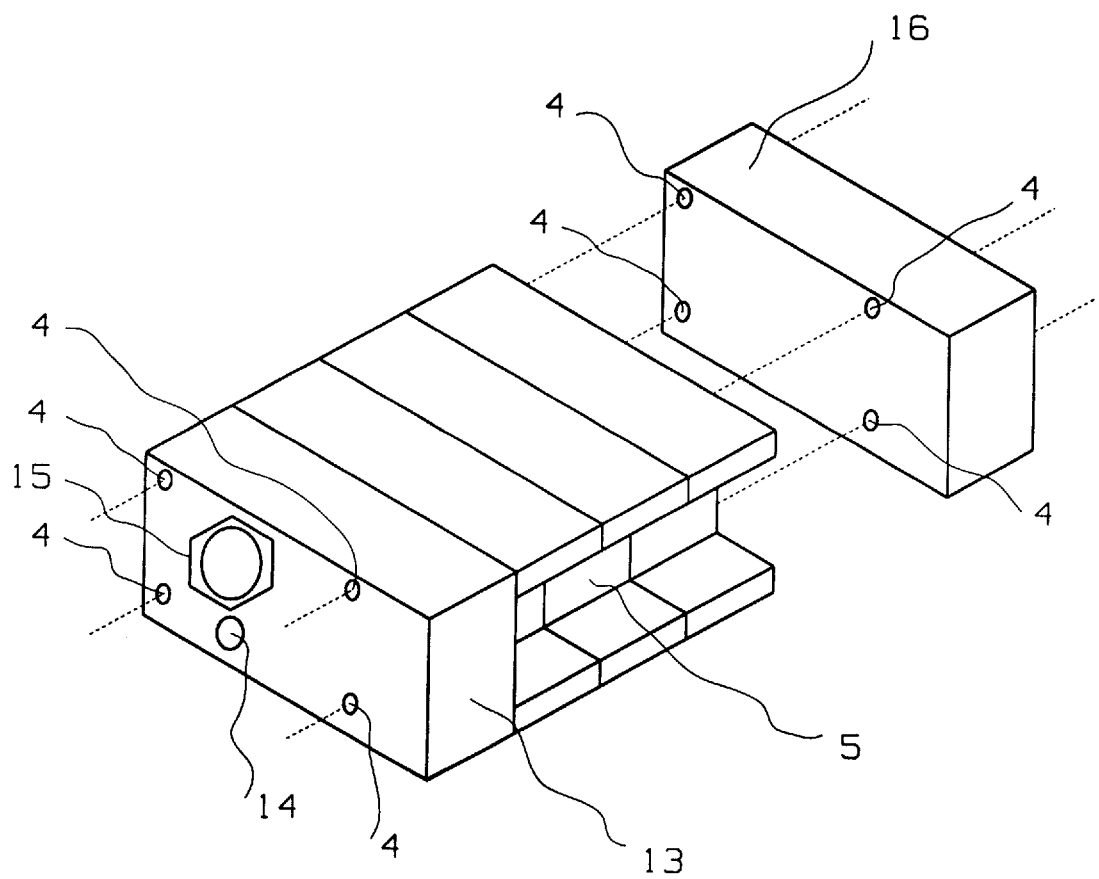

MODULAR PIEZO VALVE ARRANGEMENT

FIELD OF THE INVENTION

The present invention pertains to a piezo valve arrangement, particularly for use in medical technology applications such as gas mixers for respirators.

BACKGROUND OF THE INVENTION

A piezo valve arrangement used in medical technology for respirators or also for gas mixers is known from EP 0 109 239 A1. This publication discloses a piezoelectric valve arrangement with which a gas or liquid flow can be set, wherein the piezoelectric element is not to come into contact with the fluid flow. A plurality of such valve arrangements are shown in a fixed configuration in one embodiment.

SUMMARY AND OBJECTS OF THE INVENTION

The primary object of the present invention is to provide a valve arrangement based on piezoelectric elements, which makes possible a flexible adaptation for different application purposes.

According to the invention, a modular piezo valve arrangement is provided including at least one individual valve element. The valve element has a pressurized gas channel and a gas discharge channel in a housing arranged between a connection plate and a closing plate. The connection plate has a pressurized gas connection and a gas discharge connection. The direction of the gas flow in each valve element is from the pressurized gas channel via a metering screw, a metering channel, and a piezo vibrating element. The piezo vibrating element is held freely vibrating to the side of the gas discharge channel.

One essential advantage of the present invention is, contrary to the published state of the art, that greatly different gas volume flows can be controlled due to the possibility of easily assembling the modular valve components. The function of the present invention is to send the gas to be metered to the individual metering points, i.e., valve elements, through a separate, connected pressurized gas channel. The gas subsequently flows off through a separate gas discharge channel. A short current pulse to the associated piezo vibrating element for deflection, with release of the corresponding metering channel, is sufficient to open an individual valve element, so that the pressurized gas can flow into the gas discharge channel from the pressurized gas channel corresponding to the admission pressure and the cross section of the metering channel. A current pulse of reversed polarity causes the piezo vibrating element to seal the corresponding metering channel, wherein the gas flow is interrupted. Depending on the use of the arrangement according to the present invention, the piezo vibrating element or elements may be installed with a slight pretension against the sealing surfaces of the metering channels, which is sufficient to seal same at a given gas admission pressure, or, as an alternative, a controlled gas discharge may be achieved through a predetermined gap between the piezo vibrating element and the metering channel. In the case of the preferred use of the present invention for respirators, compressed air alone or mixed with additional gases, especially oxygen and/or noble gases, is admitted to the pressurized gas channel. The gas discharge channel is supplied in this case with the breathing gas to be delivered to the patient being respirated. The valve banks prepared with the modular valve arrangement according to the present invention are markedly smaller than the valve banks with solenoid valves currently in use, which are connected in parallel with flow values graduated in a binary pattern in relation to one another and thus make possible the metering of a practically analogous gas volume flow at binarily graduated digital increments in a simple manner. Contrary to this prior-art solution, the solution according to the present invention is characterized by a simple design of the valves, the low energy consumption and the small overall size. The mixing of various gases can be carried out in the arrangement, e.g., by supplying the pressurized gas channel from two different sides and closing the pressurized gas channel at a defined point of the valve arrangement with a ball or a suitable seal between two individual valve elements and by all valve elements acting on the common gas discharge channel. Since energy is needed only at the time of the switching over of the valve elements, the drive of the piezo vibrating elements has a very low power consumption. Finally, the arrangement according to the present invention is also very inexpensive and its assembly and maintenance are also correspondingly simple because of the reduced number of parts.

Depending on the application and the specification, an individual valve element may be equipped with one piezo vibrating element or also with a plurality of piezo vibrating elements. If two or more piezo vibrating elements are provided per valve element, these are preferably connected in parallel and are physically connected.

With every individual valve element having one or more parallel-connected, physically connected piezo vibrating elements, preferably one side is bonded gas-tightly in the housing and the opposite side of either rests on the sealing surface or forms a defined opening in the electrically non-energized state of rest.

The otherwise identical valve elements are preferably used for different gas volume flows due to the corresponding metering screw and each piezo vibrating element is energized corresponding to the gas volume flow set.

The connection plate is preferably designed as a closing plate and preferably at least one supply and discharge module is provided between at least two valve elements for feeding different gases to the pressurized gas channel and to remove the gas mixture from the gas discharge channel.

The closing plate is preferably designed as a connection plate with at least one pressurized gas connection and one gas discharge connection each, and the pressurized gas channel is preferably closed at the point of the piezo valve arrangement with a seal between two individual valve elements, and all valve elements act on the common discharge channel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a perspective view of a modular piezo valve arrangement with three individual valve elements according to FIG. 1.

DESCRIPTION OF THE PREFERRED EMBODIMENT

Figure 1:
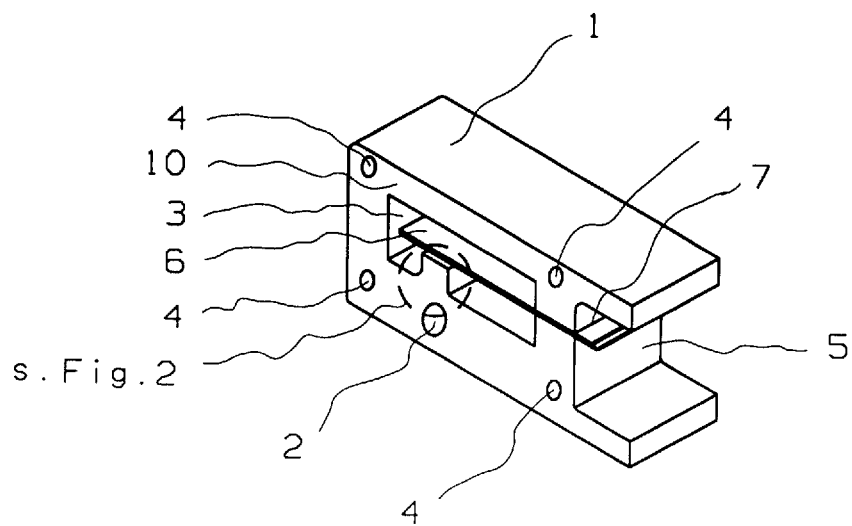
FIG. 1 is a perspective view of an individual valve element for a modular piezo valve arrangement.
Figure 2:
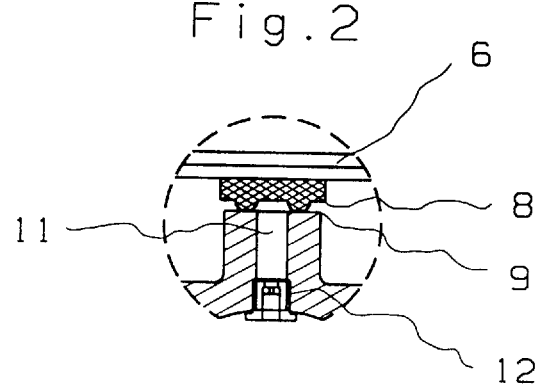
FIG. 2 is a sectional view of the circled detail of FIG. 1.

Referring to the drawings in particular, FIG. 1 shows a valve element for a modular valve arrangement according to the present invention. The essential components are a housing 1 as a basic body, which is made either as an injection-molded plastic part or as a segment of an extruded metal section. The housing 1 has one pressurized gas channel 2 and a gas discharge channel 3 each. The holes 4 are used for mechanical attachment, and the recess 5 is used to accommodate electrical contacting means and to protect the free end of the piezo vibrating element 6. Special pin-and-socket connectors may preferably be provided for accommodating the electrical contacting means of the valve elements, which also modularly fit each recess 5 of a valve element and may be detachably fastened by, e.g., snap-in means. The electrical connection between the individual valve elements and the common central control or measuring and regulating unit is ensured by such pin-and-socket connectors. An incision 7 is provided in the housing 1 on one side for accommodating the piezo vibrating element 6 such that the piezo vibrating element 6 is held in the incision 7 without clearance. The holding in the incision 7 is preferably ensured by a gas-tight bonding or with suitable sealants. As can be recognized from FIG. 2, the seal 8, made of a bonded elastomer, e.g., one based on butyl, lies on the sealing surface 9 with an O-ring contour without force. As an alternative, the seal 8 may be fastened either 20 at the free end of the piezo vibrating element 6 or on the sealing surface 9. This second alternative leads to smaller moving masses and thus to shorter switching times and a lower load on the piezo vibrating element 6. By using a sealing compound or an adhesive for mounting the piezo vibrating element 6, gas tightness is achieved against the environment, on the one hand, and, on the other hand, the piezo vibrating element 6 will be mounted flush with the attachment surface 10 of the housing 1 of the valve element. A metering channel 11, through which gas can flow from the pressurized gas channel 2 to the gas discharge channel 3, opens into the sealing surface 9. The exact gas flow is set with a metering screw 12, in which a precision hole, e.g., a watch jewel, is located. To make it possible to manufacture and mount the metering channel 11 and the metering screw 12, a mounting hole, not shown, which is closed with a closing ball or a sealant after completion of the mounting, may be provided in the lower part of the housing 1 in the pressurized gas channel 2.

To build up a modular piezo valve arrangement according to the present invention, i.e., a valve bank, FIG. 3 shows how a plurality of individual valve elements, e.g., three, can be threaded via their holes 4 on, e.g., stud bolts. A pressurized gas channel 2 extending over the width of the entire valve arrangement and a gas discharge channel 3 are thus formed. A connection plate 13 with pressurized gas connection 14 and gas discharge connection 15 are mounted before the first valve element for connection to the pressurized gas channel 2 and the gas discharge channel 3. A closing plate 16 is mounted after the last valve element for closing the longitudinal channels. Since the consecutive attachment surfaces 10 of the individual valve elements are plane parallel, the use of detachable sealing compounds, e.g., Hylomar, silicone, or other suitable materials, is sufficient for sealing. Depending on the application, an identical closing plate 16 may also be provided on both sides, and a supply module and a discharge module may be provided at a point between two individual valve elements. If a housing 1 made of metal is used, the two outer electrodes of the piezo vibrating elements are connected to the housing 1 practically directly to contact the piezo vibrating elements 6, and the housing 1 is then connected to the ground of the device. Only the middle electrode must now be contacted per valve element as an energizing line. If a housing 1 made of plastic is used, the two outer electrodes also must be contacted, preferably with the same potential. As is known to the person skilled in the art, the contacting may also be performed either by soldering, by attaching with a spring clip, or by special pin-and-socket connectors, which exactly fit the recess 5 of the valve elements.

There is a volume flow that is independent from the back pressure of the valve element during practical use at a typical admission pressure of about 2 bar (or 1 to 3 bar) in the pressurized gas channel 2 due to supercritical metering, i.e., as long as the absolute back pressure in the gas discharge channel 3 is not higher than half the absolute admission pressure in the pressurized gas channel 2.

In the case of a specific application for respiration, the volume flow of the breathing air is in the range of a few mL per minute to 100 L per minute, and especially between about 0.03 L per minute and 60 L per minute.

Ten to 12 valve elements are necessary for this for each type of gas in the case of binary increments of the individual valve elements.

While a specific embodiment of the invention has been shown and described in detail to illustrate the application of the principles of the invention, it will be understood that the invention may be embodied otherwise without departing from such principles.

What is claimed is:

1. A modular piezo valve arrangement, comprising:
   at least one individual valve element including a housing with a pressurized gas channel and a gas discharge channel in said housing and a piezo vibrating element held freely vibrating in said housing;
   a connection plate with a pressurized gas connection and with a gas discharge connection;
   a closing plate, said at least one individual valve element being arranged between said connection plate and said closing plate;
   a metering channel formed in said housing, said metering channel having a metering element, said metering channel being in fluid connection with said pressurized gas channel via said metering element wherein a direction of gas flow in said at least one valve element is from said pressurized gas channel via said metering element, said metering channel, and said piezo vibrating element to said gas discharge channel; and
   a sealing surface formed in said housing and defining an interface between said metering channel and said gas discharge channel, said piezo vibrating element having one side which is bonded gas-tightly in said housing and an opposite side which either directly rests on said sealing surface or forms a defined opening between said piezo vibrating element and said sealing surface in the electrically nonenergized state of rest.

2. The modular piezo valve arrangement in accordance with claim 1, wherein a plurality of valve elements are provided which are substantially identical except for said metering screw wherein said valve elements are used for different gas volume flows due based on a corresponding said metering screw and each said piezo vibrating element is energized corresponding to a gas volume flow set.

3. The modular piezo valve arrangement in accordance with claim 2, wherein said connection plate is substantially similar to said closing plate and at least one supply and discharge module is provided between at least two said valve elements for feeding different gases to the pressurized gas channel and to remove the gas mixture from said gas discharge channel.

4. The modular piezo valve arrangement in accordance with claim 1, wherein said closing plate is substantially similar to said connection plate with at least one said pressurized gas connection and one said gas discharge connection each, and said pressurized gas channel is closed with a seal between two individual valve elements, and all valve elements act on a common said gas discharge channel.

5. A modular piezo valve arrangement, comprising:
   a valve element including a housing with a first substantially planar surface and a second substantially planar surface, a pressurized gas channel extending from said first substantially planar surface to said second substantially planar surface, a gas discharge channel defined by said housing extending from said first substantially planar surface to said second substantially planar surface, a metering channel formed in said housing and in fluid connection with each of said pressurized gas channel and said gas discharge channel, a sealing surface formed in said housing and defining an interface between said metering channel and said gas discharge channel, a metering element setting a gas volume rate of flow from said pressurized gas channel via said metering element, said metering channel and to said gas discharge channel, and a piezo vibrating element held freely movable in said housing said piezo vibrating element having one side which is bonded gas-tightly in said housing and an opposite side which either rests on said sealing surface or forms a defined opening between said piezo vibrating element and said sealing surface in the electrically nonenergized state of rest;
   a connection plate having a connection plate substantially planar surface with a pressurized gas connection and with a gas discharge connection, said connection plate substantially planar surface being disposed adjacent to said first substantially planar surface to define a sealed interface with said pressurized gas connection in fluid communication with said pressurized gas channel and said gas discharge connection in fluid communication with said gas discharge channel;
   a closing plate having a closing plate substantially planar surface, said closing plate substantially planar surface being disposed adjacent to said second substantially planar surface to define a sealed interface.

6. The modular piezo valve arrangement in accordance with claim 5, further comprising a another valve element which is substantially identical to said valve element, said another valve element being disposed between said valve element second substantially planar surface and said closing plate substantially planar surface.

7. The modular piezo valve arrangement in accordance with claim 6, further comprising a further valve element which is substantially identical to said valve element, said further valve element being disposed between a second substantially planar surface of said another valve element and said closing plate substantially planar surface.

8. The modular piezo valve arrangement in accordance with claim 7, said metering element of said valve element is set differently from a metering element of said another valve element which is set differently from a metering element of said further valve element to provide for different set gas volume flow rates wherein each said piezo vibrating element is energized corresponding to said set gas volume flow rates.

9. The modular piezo valve arrangement in accordance with claim 8, wherein said connection plate is substantially similar to said closing plate and at least one supply and discharge module is provided between at least two said valve elements for feeding different gases to the pressurized gas channel and to remove the gas mixture from said gas discharge channel.

10. The modular piezo valve arrangement in accordance with claim 7, wherein said closing plate is substantially similar to said connection plate with at least one said pressurized gas connection and one said gas discharge connection each, and said pressurized gas channel is closed with a seal between two individual valve elements, and all valve elements act on a common said gas discharge channel.

11. The modular piezo valve arrangement in accordance with claim 10, further comprising a further valve element which is substantially identical to said valve element, said further valve element being disposed between said first another valve substantially planar surface and said second substantially planar surface of said valve.

12. The modular piezo valve arrangement in accordance with claim 11, said metering element of said valve element is set differently from said another metering element which is set differently from a metering element of said further valve element to provide for different gas volume flows wherein each said piezo vibrating element is energized corresponding to a gas volume flow set.

13. The modular piezo valve arrangement in accordance with claim 10, said metering element of said valve element is set differently from said another valve metering element to provide for different gas volume flows wherein each said piezo vibrating element is energized corresponding to a gas volume flow set.

14. The modular piezo valve arrangement in accordance with claim 10, wherein said connection plate is substantially similar to said closing plate and at least one supply and discharge module is provided between at least two said valve elements for feeding different gases to the pressurized gas channel and to remove the gas mixture from said gas discharge channel.

15. The modular piezo valve arrangement in accordance with claim 10, wherein said closing plate is substantially similar to said connection plate with at least one said pressurized gas connection and one said gas discharge connection each, and said pressurized gas channel is closed with a seal between two individual valve elements, and all valve elements act on a common said gas discharge channel.

16. The modular piezo valve arrangement in accordance with claim 6, said metering element of said valve element is set differently from a metering element of said another valve element to provide for different set gas volume flow rates wherein each said piezo vibrating element is energized corresponding to said set gas volume flow rates.

17. The modular piezo valve arrangement in accordance with claim 16, wherein said connection plate is substantially similar to said closing plate and at least one supply and discharge module is provided between at least two said valve elements for feeding different gases to the pressurized gas channel and to remove the gas mixture from said gas discharge channel.

18. The modular piezo valve arrangement in accordance with claim 6, wherein said closing plate is substantially similar to said connection plate with at least one said pressurized gas connection and one said gas discharge connection each, and said pressurized gas channel is closed with a seal between two individual valve elements, and all valve elements act on a common said gas discharge channel.

19. A modular piezo valve arrangement, comprising:

a valve element including a housing with a first substantially planar surface and a second substantially planar surface, said housing having connection openings a pressurized gas channel defined by said housing extending from said first substantially planar surface to said second substantially planar surface, a gas discharge channel defined by said housing extending from said first substantially planar surface to said second substantially planar surface, a metering channel formed in said housing and in fluid connection with each of said pressurized gas channel and said gas discharge channel, a sealing surface formed in said housing and defining an interface between said metering channel and said gas discharge channel, a metering element setting a gas volume rate of flow from said pressurized gas channel via said metering element, said metering channel and to said gas discharge channel, and a piezo vibrating element held freely movable in said housing said piezo vibrating element having one side which is bonded gas-tightly in said housing and an opposite side which either directly rests on said sealing surface or forms a defined opening between said piezo vibrating element and said sealing surface in the electrically nonenergized state of rest;

another valve element including a another valve housing with a first another valve substantially planar surface and a second another valve substantially planar surface, said another valve housing having connection openings, an another valve pressurized gas channel extending from said first another valve substantially planar surface to said second another valve substantially planar surface, an another valve gas discharge channel defined by said another valve housing extending from said first another valve substantially planar surface to said second another valve substantially planar surface, an another valve metering channel formed in said another valve housing and in fluid connection with each of said another valve pressurized gas channel and said another gas discharge channel, an another valve sealing surface formed in said another valve housing and defining an interface between said another valve metering channel and said another valve gas discharge channel, an another valve metering element setting a gas volume rate of flow from said another valve pressurized gas channel via said another valve metering element, said another metering channel and to said another valve gas discharge channel, and an another valve piezo vibrating element held freely movable in said another valve housing said another valve piezo vibrating element having one side which is bonded gas-tightly in said another valve housing and an opposite side which either directly rests on said another valve sealing surface or forms a defined opening between said another valve piezo vibrating element and said another valve sealing surface in the electrically nonenergized state of rest;

a connection plate having a connection plate substantially planar surface with a pressurized gas connection and with a gas discharge connection, said connection plate substantially planar surface being disposed adjacent to said first substantially planar surface to define a sealed interface with said pressurized gas connection in fluid communication with said pressurized gas channel and said gas discharge connection in fluid communication with said gas discharge channel;

a closing plate having a closing plate substantially planar surface, said closing plate substantially planar surface being disposed adjacent said second another valve substantially planar surface to define a sealed interface between said another valve and said closing plate, said valve second substantially planar surface being positioned adjacent to said first another valve substantially planar surface.

20. The modular piezo valve arrangement in accordance with claim 19, wherein said connection plate is substantially similar to said closing plate and at least one supply and discharge module is provided between at least two said valve elements for feeding different gases to the pressurized gas channel and to remove the gas mixture from said gas discharge channel.

* * * * *